United States Patent [19]

Anderson et al.

[11] Patent Number: 5,280,704

[45] Date of Patent: Jan. 25, 1994

[54] LOCK FOR A THRUST REVERSER MECHANISM, A THRUST REVERSER MECHANISM, AND A THRUST REVERSER

[75] Inventors: Michael J. Anderson, Stafford; Terence J. Capewell, Staffordshire; Stephen H. Davies, Shropshire; Mark Guy, Staffordshire; Kevin Hadley, South Staffordshire; John H. Harvey, Wolverhampton; Nigel R. Moorhouse, Wolverhampton; Alan T. Rollason, Wolverhampton, all of England

[73] Assignee: Lucas Industries public limited company, West Midlands, England

[21] Appl. No.: 959,118

[22] Filed: Oct. 9, 1992

[30] Foreign Application Priority Data

| Oct. 10, 1991 | [GB] | United Kingdom | 9121566 |
| Nov. 28, 1991 | [GB] | United Kingdom | 9125326 |
| Dec. 10, 1991 | [GB] | United Kingdom | 9126149 |
| Dec. 24, 1991 | [GB] | United Kingdom | 9127392 |

[51] Int. Cl.⁵ .................................... F02K 3/02
[52] U.S. Cl. .................... 60/226.2; 60/230; 239/265.19
[58] Field of Search ........ 60/226.2, 230, 232, 60/223; 244/110 B; 239/265.19, 265.29, 265.31

[56] References Cited

U.S. PATENT DOCUMENTS 2,944,394  7/1960  Peregrine et al.
4,383,647  5/1983  Woodruff et al. ............ 244/110 B
4,586,329  5/1986  Carlin ........................... 60/226.2
5,167,119  12/1992  Ward ............................ 60/226.2

FOREIGN PATENT DOCUMENTS

| 0076750 | 4/1983 | European Pat. Off. |
| 0090541 | 10/1983 | European Pat. Off. |
| 2067360 | 8/1971 | France |
| 2534985 | 10/1983 | France |
| 472582 | 6/1969 | Switzerland |
| 284750 | 8/1972 | United Kingdom |
| 2026407 | 2/1980 | United Kingdom |

OTHER PUBLICATIONS

Japanese Patent Abstract, vol. 7, No. 271, Dated Dec. 3, 1983 and Corresponding Japanese Patent Application JP-58 149 405, Dated Sep. 5, 1983.

*Primary Examiner*—Richard A. Bertsch
*Assistant Examiner*—W. J. Wicker
*Attorney, Agent, or Firm*—Trexler, Bushnell, Giangiorgi & Blackstone, Ltd.

[57] ABSTRACT

A lock has a shaft coupled to a flexible shaft which synchronizes hydraulic actuators of a translating cowl thrust reverser. The shaft is provided with a rotary brake comprising axially movable rotating and fixed discs urged together by a spring. The rotating discs are rotationally fixed to an armature of a solenoid which, when actuated, releases the rotary brake to allow the shaft to rotate and the thrust reverser to be deployed or stowed.

15 Claims, 5 Drawing Sheets

LOCK FOR A THRUST REVERSER MECHANISM, A THRUST REVERSER MECHANISM, AND A THRUST REVERSER

The present invention relates to a lock for a thrust reverser mechanism, a thrust reverser mechanism including such a lock, and a thrust reverser including such a mechanism.

In aerospace applications, it is common to provide a jet engine with a thrust reverser which allows the normally rearwardly directed gases to be directed forwardly, for instance for aircraft braking purposes. A known type of thrust reverser of the translating cowl type is operated by means of hydraulic piston/cylinder arrangements or jacks. In this type of mechanism, a generally cylindrical cowl surrounding the engine is translated axially so as to uncover forwardly directed louvres in order to direct the engine exhaust gas flow through these louvres so as to generate the reversely directed thrust. The cowl is translated by a number of jacks positioned at intervals around the cowl. The extension of each jack causes rotation of a flexible shaft interconnecting the jacks so as to maintain synchronism in the operation of the jacks.

Each jack incorporates a locking mechanism which mechanically locks the piston of the jack relative to the cylinder so as to prevent its extension or retraction. A demand for extension or retraction initiates the provision of high pressure hydraulic fluid to the jack and this is applied to a lock release mechanism and to the cylinder of the jack so as to cause the demanded displacement.

Despite the many safety features built into the control system of such a thrust reverser, in certain circumstances, high pressure fluid may become present at the jack when it has not been demanded. For instance, blockage of a flow passage in the control system may cause a rise in pressure by disrupting the flow to a return line. Alternatively, high pressure fluid may leak past a worn or faulty seal. In general, it is extremely difficult to eliminate all the possible causes of inadvertent application of high pressure fluid, although the statistical probability of such an occurrence is well within the limits specified for safe aircraft operation.

According to a first aspect of the invention, there is provided a lock for a thrust reverser mechanism, comprising normally-locked mechanical locking means for connection to a thrust reverser operating mechanism for preventing operation of the mechanism, and electromechanical means for selectively unlocking the locking means to permit operation of the mechanism.

It is thus possible to provide a thrust reverser with a lock which cannot be accidentally unlocked because of a fault in a pressurised fluid system, for instance for operating the thrust reverser. Such an arrangement therefore provides greater security against inadvertent operation of a thrust reverser, since the lock has to be unlocked by an electrical signal before the thrust reverser can be operated, for instance by the application of high pressure fluid. The lock is preferably used in addition to any hydromechanical or other locking system already present in the thrust reverser operating mechanism.

In the translating cowl type thrust reverser, the lock may be located at one of the jacks, for instance in engagement with the flexible shaft or an end thereof, and prevents operation of the thrust reverser even if high pressure fluid is applied to the jacks. Thus, the lock should be sufficiently effective to prevent the cowl moving against the forces present when high pressure fluid is applied to the jacks.

The locking means may comprise a rotary brake arranged to brake a shaft for connection to the mechanism. The rotary brake may comprise first brake discs rotationally fixed to the shaft and cooperating with second rotationally fixed brake discs, for instance rotationally fixed to a housing. Biasing means are preferably provided for biasing the first and second discs axially into engagement. The biasing means may comprise a spring, such as a compression spring.

The electromechanical means may comprise a solenoid, for instance arranged to disengage the first and second discs. The first discs may be rotationally fixed to a member, such as an armature of the solenoid, which is selectively disengageable from the shaft. The shaft and member may be biased, for instance by a spring such as a compression spring, into engagement with each other and may be axially movable out of engagement. A manual drive arrangement may be provided and may comprise a connector for receiving a suitable tool and arranged to disengage the shaft and the member and transmit rotation to the shaft when the tool is applied to the connector. The manual drive arrangement may be arranged to disengage from the shaft when fluid within the lock is pressurised.

The locking means may comprise at least one rotary stop arranged on a shaft for connection to the mechanism and at least one peg biased, for instance by a spring, towards an engaging position for engaging the at least one stop so as to prevent or limit rotation of the shaft. The or each stop may comprise a tooth extending from a plate, such as a disc, which is rotationally fixed to the shaft. The or each peg may be movable parallel to the axis of the shaft away from the engaging position. The electromechanical means may comprise a solenoid arranged to move the or each peg away from the engaging position. A manual drive arrangement may be provided and may comprise a connector for receiving a suitable tool and arranged to disengage the or each stop from the shaft for relative rotation therebetween and to transmit rotation to the shaft when the tool is applied to the connector. The manual drive arrangement may be arranged to disengage from the shaft when fluid within the lock is pressurised.

It is thus possible to provide a relatively simple arrangement for connecting the brake to the thrust reverser operating mechanism and to incorporate an arrangement which permits disengagement of the lock for manually operating the thrust reverser, for instance during servicing and repair of the engine. By arranging for the shaft and the member to be disengageable, it is not necessary to act against the bias which engages the brake but, instead, it can be sufficient to overcome a much smaller force for normally coupling the shaft and the member for rotation together. By arranging for the manual drive arrangement to be disengaged under fluid pressure, the provision of the manual drive arrangement does not interfere with normal operation of the thrust reverser and hydraulic seals are not subjected to relative rotation.

Preferably means are provided for preventing release of the lock when an aircraft incorporating the lock is in flight. For instance, there may be provided a sensor for sensing when an aircraft undercarriage is properly lowered and/or when the aircraft is being carried by the wheels, the lock being prevented from being unlocked in the absence of a suitable signal from the sensor.

Preferably means are provided for preventing a change of locking state of the lock when fluid within the lock is pressurised. The preventing means may comprise a piston movable when the fluid within the lock is pressurised to prevent movement of the electromechanical means.

According to a second aspect of the invention, there is provided a thrust reverser operating mechanism including a lock in accordance with the first aspect of the invention.

According to a third aspect of the invention, there is provided a thrust reverser including a mechanism in accordance with the second aspect of the invention.

The invention will be further described, by way of example, with reference to the accompanying drawings, in which.

Figure 1:
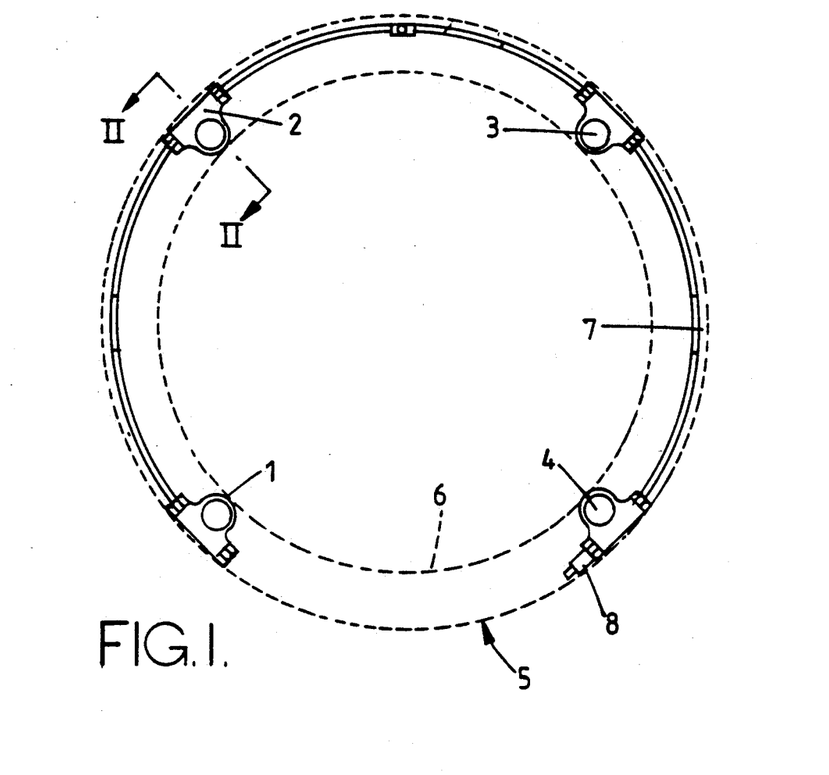
FIG. 1 is a schematic diagram of a thrust reverser operating mechanism.
Figure 2:
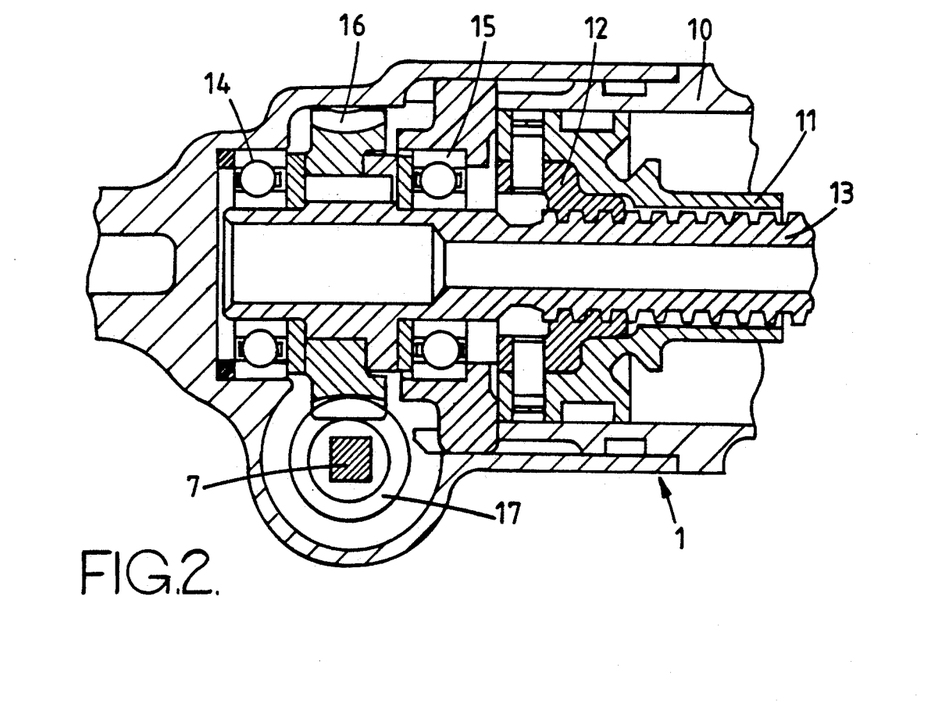
FIG. 2 is a cross-section on line II—II of FIG. 1.

The thrust reverser operating mechanism shown in FIG. 1 comprises four piston/cylinder actuators or jacks 1 to 4 attached between a casing 5 of a jet engine and a translating cowl 6. The jacks are operated by high pressure hydraulic fluid so as to move the cowl 6 axially of the engine between a normal position, in which exhaust gas flow is directed rearwardly of the engine, and a reverse position, in which the exhaust gas flow is directed forwardly of the engine so as to provide reverse thrust. The jacks 1 to 4 are connected to a flexible shaft 7, as shown in FIG. 2, so that movement of the jacks is synchronised. The flexible shaft 7 extends beyond the jack 4 to provide a connector 8 to allow the cowl to be moved in the absence of pressurised hydraulic fluid. Such a facility is necessary in order to allow service personnel to move the cowl during servicing and repair.

FIG. 2 shows the mechanical transmission arrangement between the jack 1 and the flexible shaft 7 in more detail. The jack 1 comprises a cylinder 10 containing a piston 11 which is movable axially of the cylinder by hydraulic pressure. The piston 11 is provided, in its interior, with a nut 12 which moves axially with the piston but which is prevented from rotating. The nut 12 has an internal screw thread which cooperates with an externally threaded shaft 13 which is rotatable in bearings 14 and 15 but which is prevented from moving axially.

The shaft 13 carries a pinion 16 which rotates with the shaft. The pinion 16 meshes with a worm gear 17, which is rotationally fixed to the flexible shaft 7.

Thus, axial movement of the piston 11 within the cylinder 10 is converted into rotation of the shaft 13. This rotation is further transmitted by the pinion 16 and the worm gear 17 to rotation of the shaft 7. Each of the jacks 1 to 4 is provided with an arrangement as shown in FIG. 2, so that the jacks are constrained to move substantially in synchronism.

Figure 3:
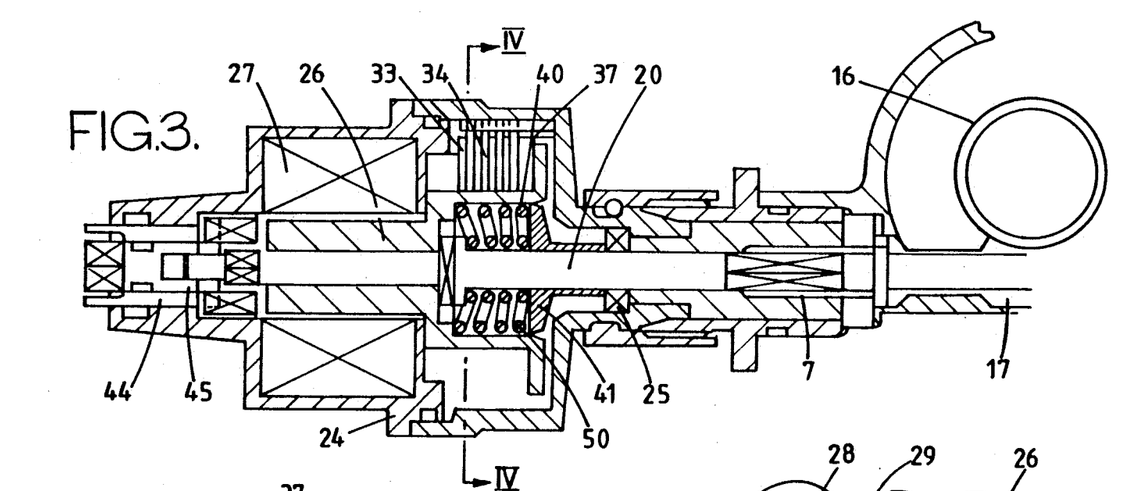
FIG. 3 is a sectional view of a lock constituting a first embodiment of the invention for use with the mechanism of FIG. 1.
Figure 4:
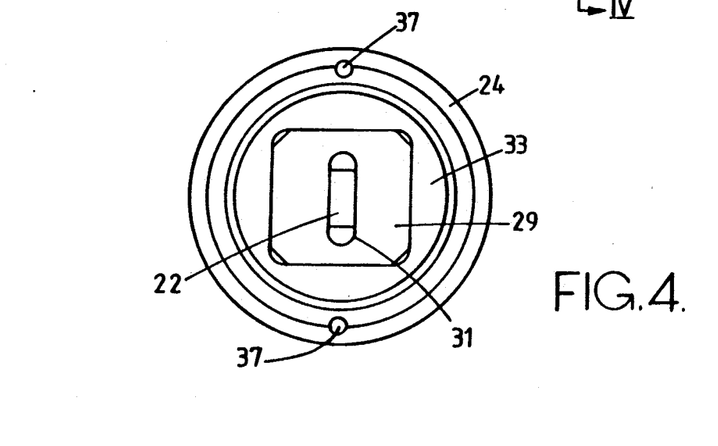
FIG. 4 is a cross-section on line IV—IV of FIG. 3.

The jacks 1 to 4 are each provided with hydromechanical locking arrangements intended to prevent inadvertent movement of the cowl in the absence of high pressure fluid supply to the jacks. In addition, the connector 8 at one end of the flexible shaft 7 is provided with a lock as shown in FIG. 3. The lock comprises a shaft 20 which is shown in more detail in FIG. 6. One end 21 of the shaft is provided with a square cross-section for engaging in a square socket end of the flexible shaft 7. The shafts 7 and 20 are therefore constrained for rotation together but are axially displaceable relative to each other.

Figure 6:
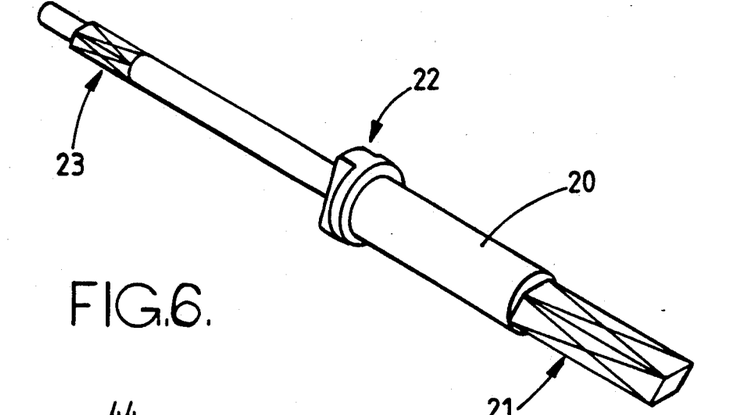
FIG. 6 is an isometric view of a shaft of the lock of FIG. 3.

Adjacent its mid point, the shaft 20 has an armature engagement dog 22. The other end 23 of the shaft 20 is also provided with a square cross-section to permit manual rotation of the shaft, as will be described hereinafter.

Figure 5:
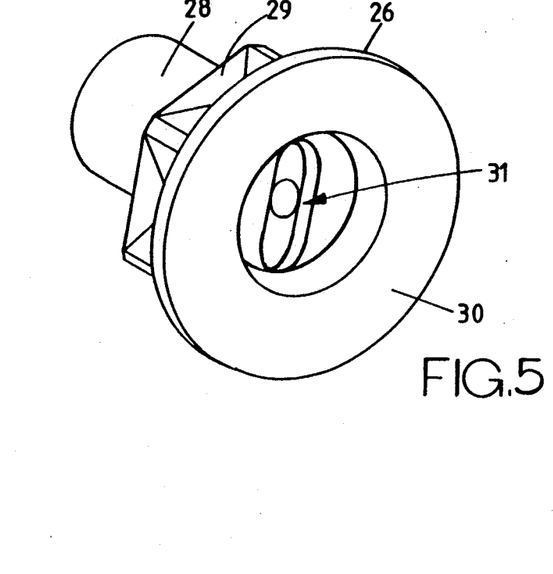
FIG. 5 is an isometric view of an armature of the lock of FIG. 3.

The shaft 20 passes through a housing 24 of the lock and through the middle of an armature 26 which cooperates with a winding 27 to form a solenoid. The armature 26 is shown in more detail in FIG. 5 and comprises a cylindrical portion 28, a square section portion 29, and an annular flange 30. A drive shaft engagement slot 31 is formed within the portion 29 and is arranged so that, during normal operation of the lock, the dog 22 engages in the slot 31 so as to constrain the shaft 20 and the armature 26 for rotary movement together.

Figure 9:
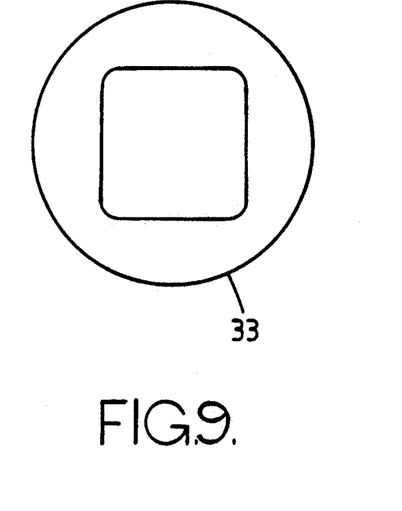
FIG. 9 is an elevational view of a rotary disk of the the lock of FIG. 3.
Figure 10:
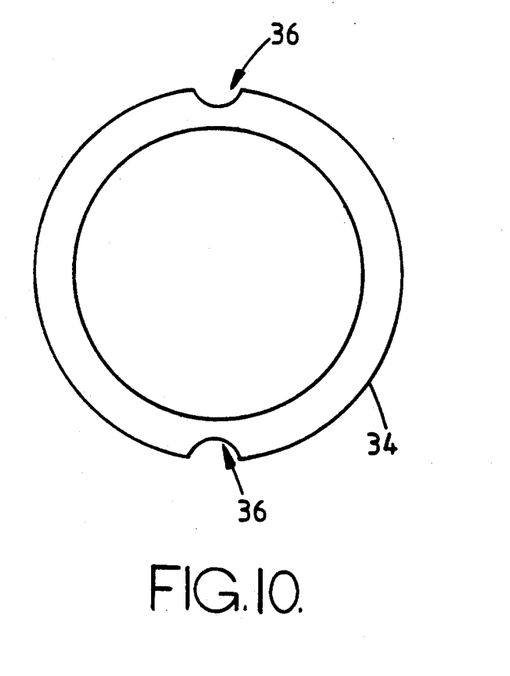
FIG. 10 is an elevational view of a fixed disk of the lock of FIG. 3.

The housing contains a plurality of rotary brake discs 33 and fixed brake discs 34. The discs may be provided with high friction surface treatment or covering. The rotary discs 33 have the shape shown in FIG. 9 with a square central aperture so as to be axially slidable on the square portion 29 of the armature 26 but rotationally fixed thereto. The fixed discs 34 are annular and are provided with diametrically opposite cut outs 36 which locate on pins 37 fixed to the housing 24. The discs 34 are thus rotationally fixed to but axially slidable within the housing 24. The rotary and fixed discs alternate with each other axially within the housing.

A compression spring 40 acts between the armature 26 and a member 41 which is prevented from axial movement by abutting against a bearing 25. The spring 40 thus urges the discs 33 and 34 into braking engagement with each other so as to prevent the shaft 20 from rotating with respect to the housing 24.

Figure 7:
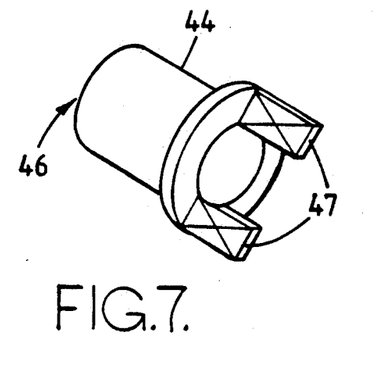
FIG. 7 is an isometric view of a sleeve of the lock of FIG. 3.
Figure 8:
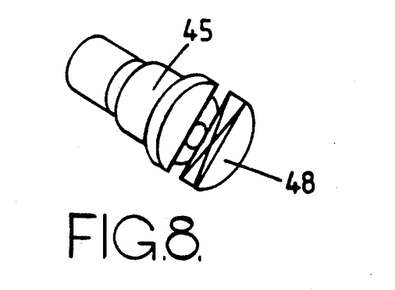
FIG. 8 is an isometric view of a plunger of the lock of FIG. 3.

The end 23 of the shaft 20 projects beyond the armature 26 and cooperates with a manual drive arrangement comprising a sleeve 44 and a plunger 45 shown in more detail in FIGS. 7 and 8, respectively. The sleeve 44 has a socket at its end 46 for receiving a manual drive tool, such as a wrench. At its other end, the sleeve 44 has a dog arrangement 47 for engaging in a slot of an enlarged end 48 of the plunger 45. The squared end 23 is receivable in the slot so as to allow manual drive to be transmitted from the sleeve 44 via the plunger 45 to the shaft 20.

During normal operation, the dog 22 of the shaft 20 is biased by a compression spring 50, acting against the member 41, into engagement with the slot 31 of the armature 26. Thus, with the winding 27 of the solenoid deactivated, the compression spring 40 engages the brake discs 33 and 34 with each other so as to prevent movement of the shaft 7. The braking action provided by the discs 33 and 34 is sufficient to overcome the force applied by the jacks 1 to 4 so that, even if full hydraulic pressure were applied to the jacks, the lock would prevent movement of the thrust reverser cowl 6 and so prevent inadvertent operation of the thrust reverser.

In order for the thrust reverser to be operated, it is necessary to energise the solenoid by applying power to the winding 27 and to supply high pressure hydraulic fluid to the jacks 1 to 4. The solenoid when energised causes the armature 26 to be moved rightwards in FIG. 3 against the action of the spring 40. The discs 33 and 34 are thus permitted to disengage so as to remove the braking action on the shaft 20 via the armature 26 and the dog 22 and slot 31 coupling. The flexible shaft 7 is therefore permitted to rotate and the high pressure hydraulic fluid applied to the jacks 1 to 4 causes the cowl to be translated. The solenoid may be deactivated with the cowl at either of its extreme positions, or may only be deactivated when the cowl has been withdrawn to the position corresponding to normal forward thrust.

Actuation of the solenoid may be interlocked with a sensor for detecting when the undercarriage is down and the aircraft is on the wheels, so that the thrust reverser is permitted to operate only after the aircraft has landed, this being the only circumstance in which reverse thrust is required.

When the solenoid is de-energised, the armature 26 is urged leftwardly in FIG. 3 so as to cause the discs 33 and 34 to re-engage and prevent further rotation of the shaft 20, and hence of the shaft 7. The spring 50 ensures that the dog 22 of the shaft 20 remains in engagement with the slot 31 of the armature 26, the shaft 20 moving axially to match movement of the armature 26 while the end 21 remains in rotational engagement with the shaft 7.

When service personnel need to move the cowl 6 of the thrust reverser for servicing and repair, it is necessary to be able to do this manually as, in general, there will be no electrical supply and pressurised hydraulic fluid supply available. Thus, a wrench of a suitable design for engaging in the socket at the end 26 of the sleeve 44 is applied and urges the plunger 45 towards the right in FIG. 3. This causes the dogs 47 to engage in the slot in the end 48 of the plunger, and the central part of the slot engages over the square end 23 of the shaft 20. The plunger 45 urges the shaft 20 axially against the compression spring 50 so that the dog 22 disengages from the slot 31 in the armature 26. The shaft 20 is therefore disengaged from the braking effect of the brake discs 33 and 34, and can be turned by rotating the sleeve 44 by means of the wrench or the like. It is therefore possible for service personnel to move the cowl 6 manually without having to disengage the brake discs 33 and 34 and without having to overcome the brake loading provided by the compression spring 40.

Once manual operation of the thrust reverser has finished, the wrench is withdrawn and the spring 50 urges the shaft 20 to the left in FIG. 3 so that the dog 22 can re-engage in the slot 31. The braking effect of the discs 33 and 34 is thus restored, possibly after some relative rotation between the armature 26 and the shaft 20 so as to re-establish engagement of the dog 22 in the slot 31. In order for the sleeve 44 and the plunger 45 to be disengaged, the interior of the housing 24 is connected to a source of high pressure hydraulic fluid, for instance as supplied to the jacks 1 to 4 for actuation thereof. Thus, whenever the pressure of the fluid rises, for instance when the thrust reverser is to be operated, the hydraulic pressure forces the sleeve 44 and the plunger 45 out of engagement with the end 23 of the shaft 20. The provision of the manual drive arrangement does not therefore interfere with operation of the lock or of the thrust reverser and hydraulic seals are not subjected to rotation.

The lock may be incorporated in new thrust reverser systems or may readily be added to existing systems installed in existing jet engines. Further, the lock may readily be adapted to other applications, for instance in thrust reversers of other types.

Figure 11:
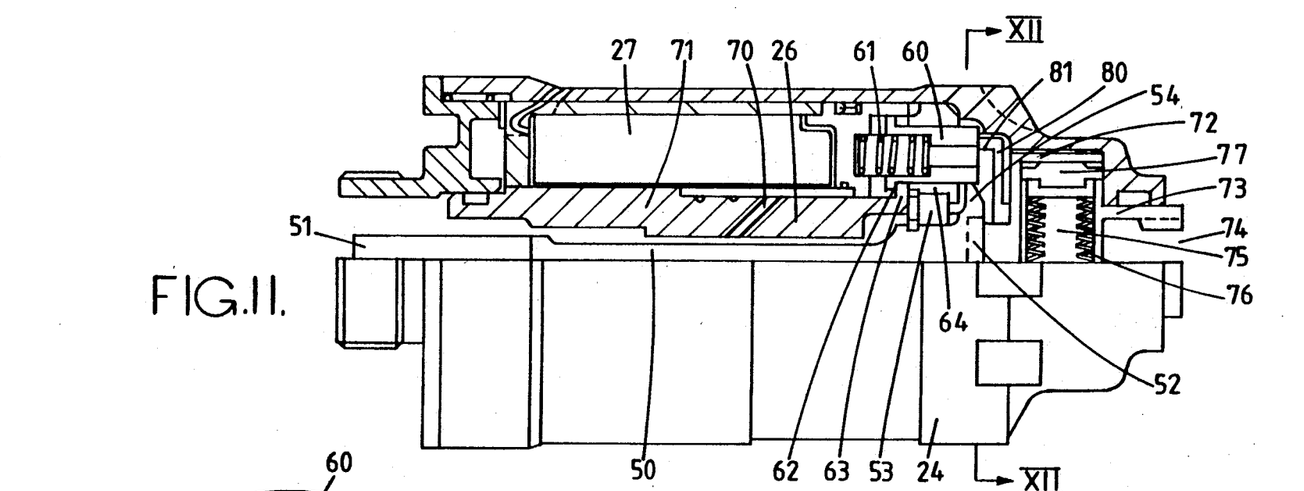
FIG. 11 is a part-sectional view of a lock constituting a second embodiment of the invention for use with the mechanism of FIG. 1.

The lock shown in FIG. 11 comprises a housing 24, an armature 26, and a winding 27 which correspond to the equivalent components of the embodiment shown in FIG. 3. However, the lock of FIG. 11 differs from that of FIG. 3 in that the friction brake is replaced by a different type of locking arrangement.

Figure 12:
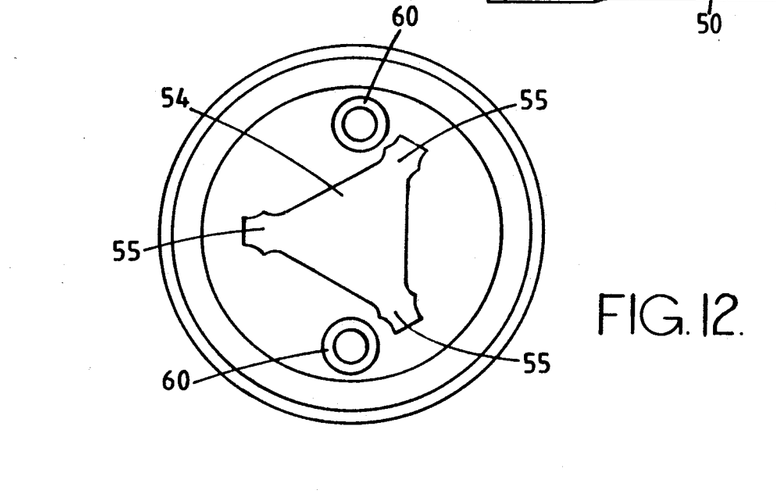
FIG. 12 is a cross section on line XII—XII of FIG. 11.

The lock of FIG. 11 comprises a shaft 50 having an end 51 of square cross-section for engaging in a square socket end of the flexible shaft 7. The other end of the shaft 50 is provided with a dog 52 to permit manual rotation as will be described hereinafter. The other end of the shaft 50 is radially enlarged to form a disc 54. The disc 54 has three radially extending teeth 55 which are equi-angularly spaced about the axis of the disc. Thus, as shown in FIG. 12, the disc 54 is of generally equi-lateral triangular shape. A bearing 53 supports the other end of the shaft 50.

Two diametrically opposed pegs 60 are mounted in the housing 24. Each peg 60 is slidably mounted in a cylindrical recess of the housing 24 so as to be movable substantially parallel to the axis of the shaft 50. The pegs 60 are biased towards the right in FIG. 11 by means of respective compression springs 61. Such rightward movement is limited by the engagement of an external annular shoulder 62 behind an external annular shoulder 63 on the armature 26 and by the abutment of the armature 26 against an internal shoulder 64 of the housing 24.

The pegs 60 are normally urged towards the right in FIG. 11 by the compression springs 61 so as to occupy the positions shown in FIGS. 11 and 12. In these positions, the pegs 60 extend into the rotary path of the teeth 55 so as to prevent or limit rotation of the disc 54 and hence, during normal operation, of the shaft 50. As shown in FIG. 12, by suitably arranging the pegs 60 and by suitably dimensioning the teeth 55, permitted rotation of the shaft is limited to only a few degrees of rotation. Thus, when the lock is engaged in order to prevent inadvertent operation of the thrust reverser, any attempt to operate the thrust reverser without first disengaging the lock shown in FIGS. 11 and 12 causes one of the teeth 55 to abut against one of the pegs 60, thus preventing rotation of the shaft 50 and preventing movement of the thrust reverser.

In order to operate the thrust reverser, the lock must first be disengaged. In order to achieve this, the winding 27 of the solenoid is energised so that the armature 26 moves leftwardly in FIG. 11 until an air gap 70 is closed and the armature 26 abuts against a core 71 of the solenoid. The engagement of the shoulders 62 and 63 causes the pegs 60 to be withdrawn against the action of the springs 61 so that the pegs move out of the rotary path of the teeth 55. The disc 54 and the shaft 50 are therefore free to rotate so that the thrust reverser can be operated. When the lock is to be reengaged, the winding 27 is de-energised and the compression springs 61 return the pegs 60 and the armature 26 to the position shown in FIG. 11 so that the ends of the pegs again project into the rotary path of the teeth 55, thus preventing further rotation of the disc 54 and the shaft 50.

The lock of FIG. 11 further differs from the lock of FIG. 3 in that a different type of manual drive arrangement is provided. The dog 52 at the end of the shaft 50 is engagable in a slot formed in a cage member 72 which is connected to a drive member 73 having an end socket 74 for a manual drive tool by a torque limiting transmission. The torque limiting transmission comprises diametrically opposed plungers 75 which are spring loaded radially outwardly by compression spring washers 76. The plungers 75 act on rollers 77 which are normally urged by the spring loading into grooves formed in an internal cylindrical surface of the cage member 72.

In order to operate the thrust reverser manually, a suitable tool is inserted into the socket 74 and urged leftwardly in FIG. 11 so as to move the drive member 73 and the cage member 72 leftwardly. The dog 52 thus engages in the slot in the cage member 72 and a disc 80 with an annular shoulder 81 pushes the pegs 60 out of the rotary path of the teeth 55 so as to permit rotation of the shaft 50.

During normal manual operation of the thrust reverser, the rollers 77 are held in the grooves of the cage member 72 by the action of the plungers 75 and the spring washers 76. However, in order to prevent damage to the thrust reverser mechanism caused by excessive torque, for instance if an obstruction is encountered, the force exerted by the spring washers 76 is such as to allow the rollers 77 to ride out of the grooves in the cage member 72. The drive member 73 is thus rotationally decoupled from the cage member 72 when drive torque exceeds a limiting value.

When the tool is withdrawn from the socket 74, the springs 61 urge the pegs 60 to the right in FIG. 11. At least one of the pegs 60 returns to its position as shown in FIG. 11, thus pushing the disc 80 to the right and at least partially disengaging the dog 52 from the slot in the cage member 72 by pushing the cage member 72 and the drive member 73 to the right. When hydraulic pressure is again applied to the fluid within the housing 24, this pressure ensures that the cage member 72 and the drive member 73 are moved fully to the right so as to ensure that the dog 52 is disengaged from the slot.

The lock shown in FIGS. 11 and 12 has certain advantages compared with the lock shown in FIG. 3. In particular, drag caused by residual contact of the brake discs in FIG. 3 is eliminated and viscous drag on the brake discs caused by the presence of hydraulic fluid within the housing is substantially reduced. Further, the rotational inertia of the rotary parts of the lock of FIG. 11 is no greater than, and may be less than, for the lock of FIG. 3.

The lock shown in FIGS. 11 and 12 prevents movement of the thrust reverser mechanism unless and until the solenoid is actuated. Further, if a failure occurs in the lock, for instance if the solenoid fails, then movement of the thrust reverser mechanism to activate or deactivate the thrust reverser is prevented. Although it is desirable to prevent the thrust reverser from being actuated in the event of a fault or failure in the lock, it may be desirable to allow the thrust reverser to be deactuated irrespective of the condition of the lock so as to allow forward thrust of the engine.

In order to permit this, the lock of FIGS. 11 and 12 may be modified so as to provide a ratchet arrangement whereby the shaft 50 is permitted to rotate in a direction for deactuating the thrust reverser but is prevented from rotating in the opposite direction so that the thrust reverser cannot be actuated unless the lock is working correctly and the solenoid is energised. For instance, the leading edges of the teeth 55 in the direction of rotation for deactuating the thrust reverser may be provided with chamfers or inclined surfaces which are capable of pushing the pegs 60 axially against the springs 61 out of the path of rotation of the teeth 55. Alternatively or additionally, chamfered or inclined surfaces may be provided on the pegs 60 to permit such movement in the rotary direction corresponding to deactivation of the thrust reverser.

It may also be desirable to provide an indication of the state of the lock. Thus, each of the pegs 60 may be provided with a transducer, such as a linear variable displacement transducer, for indicating the axial positions of the pegs 60.

Figure 13:
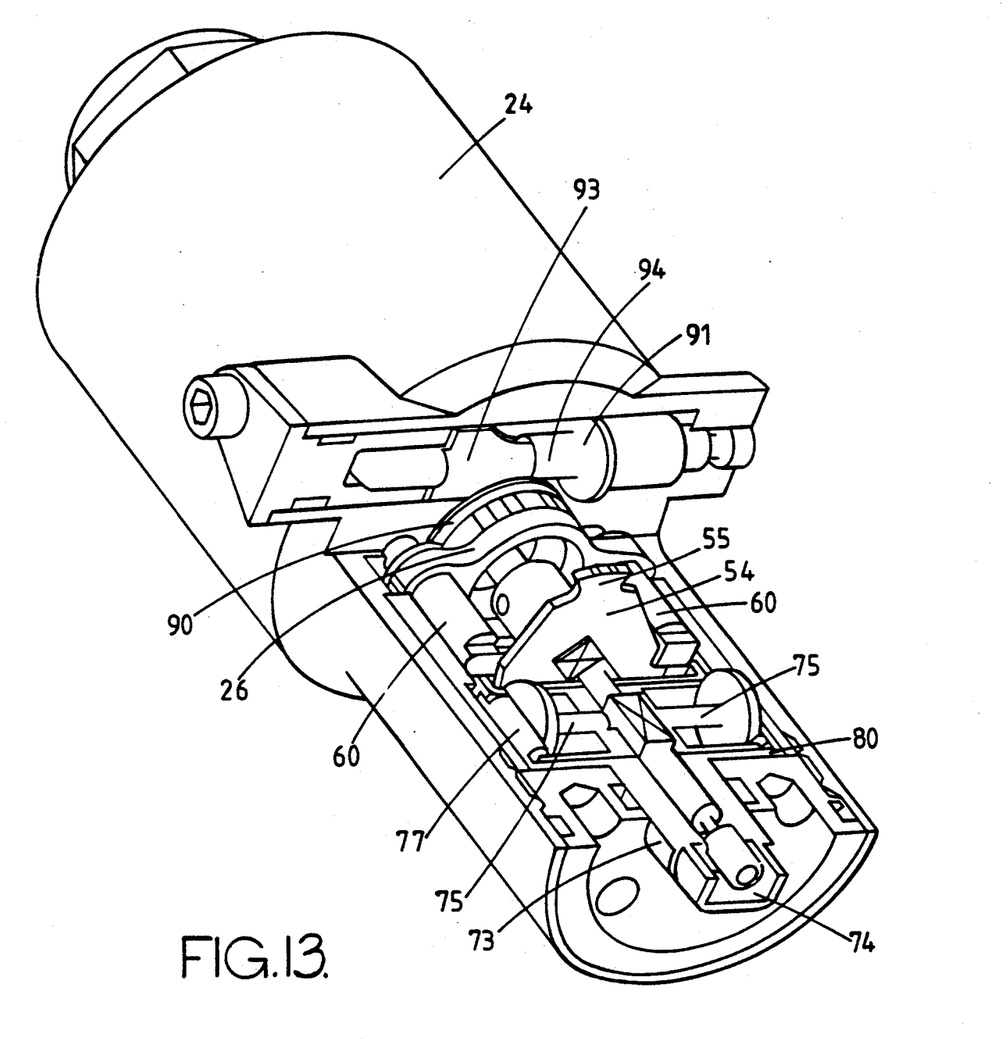
FIG. 13 is a part-sectional view of a lock consisting a third embodiment of the invention for use with the mechanism of FIG. 1.
Figure 14:
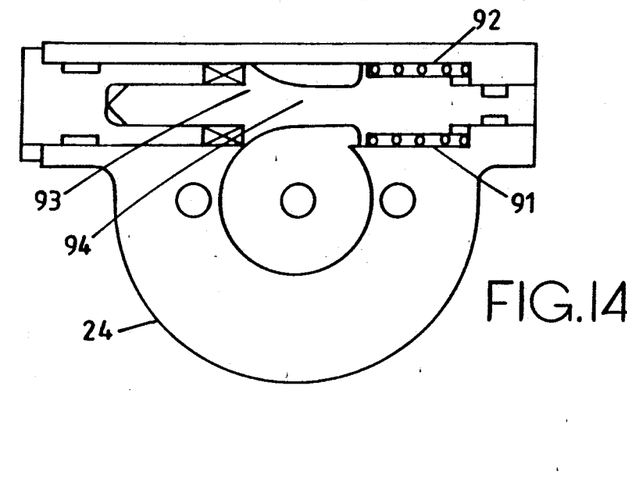
FIG. 14 is a cross-sectional view of the lock of FIG. 13.

FIGS. 13 and 14 show a lock which represents a further modification of the lock shown in FIGS. 11 and 12. Like reference numerals refer to like parts which will not be further described.

The armature 26 is modified, compared with that in FIGS. 11 and 12, by the provision of an external annular collar 90. Further, the housing 24 is modified so as to provide a cylinder containing a piston 91 which is movable transversely of the housing 24. The piston 91 is exposed to hydraulic fluid within the housing 24 and is movable against the action of a return spring 92 when the hydraulic fluid is pressurised i.e. when the thrust reverser is to be actuated or deactuated.

The piston 91 is mounted on a piston rod 94 having a flattened portion 93 which is movable in a slot within the housing 24 to prevent rotation of the piston rod 94 about its axis. When the fluid within the housing is pressurised, the piston 91 is urged to the right in FIGS. 13 and 14 against the action of the return spring 92 so that the flattened portion 93 is moved into the path of movement of the shoulder 90 on the armature 96. In this condition, the armature is prevented from moving so that the state of the lock cannot be changed i.e. it remains locked or unlocked for as long as the fluid within the housing 24 is pressurised. When the pressure is released, the return spring 92 returns the piston 91 and the piston rod 94 to the position shown in FIGS. 13 and 14, so that the flattened portion 93 moves out of the path of movement of the shoulder 90 of the armature 26. The armature 26 is thus capable of movement so as to lock or unlock the lock in accordance with the state of energisation of the solenoid.

In normal operation with the thrust reverser deactuated in order to permit normal forward thrust, the solenoid is deactuated so that the thrust reverser lock is held on in order to prevent actuation of the thrust reverser during normal flight. When the thrust reverser is to be deployed. the solenoid is actuated in response to a signal indicating that the aircraft undercarriage has been deployed, so that the lock is deactuated, although the hydromechanical actuator lock of the thrust reverser mechanism remains on. Hydraulic pressure is then supplied to the thrust reverser mechanism in response to a signal indicating that the engine has been throttled down. The hydromechanical lock is thus released and the hydraulic pressure within the lock prevents movement of the armature 26, so that the lock is prevented from being actuated while the thrust reverser is actuated, irrespective of actuation of the solenoid within the lock. In order to deactuate the thrust reverser, the hydraulic pressure must first be released to permit the lock to be deactuated. The solenoid may then be energised so as to deactuate the lock and hydraulic pressure again applied so that further movement of the armature is prevented while the thrust reverser is being deactuated.

Thus, once deactuation or actuation of the thrust reverser has begun, it cannot be stopped because of a failure in the solenoid or of electrical signals which control the solenoid. Further, the inadvertent application of pressure in the thrust reverser mechanism, and hence in the lock, cannot cause the inadvertent actuation or deactuation of the thrust reverser. This arrangement therefore provides increased security and reliability for thrust reverser operation.

We claim:

1. A lock for a thrust reverser mechanism, in which the thrust reverser mechanism has a plurality of actuators for operating thrust reverser and a synchronizing mechanism having a synchronizing shaft for maintaining the actuators substantially in synchronism, said lock comprising normally locked mechanical locking means comprising a shaft for connection to the synchronizing shaft, first brake discs rotationally fixed with respect to said shaft, and second rotationally fixed brake discs co-operating with said first brake discs for braking said shaft so as to restrict rotation of the synchronizing shaft so as to prevent operation of the thrust reverser mechanism, and electromechanical means for selectively unlocking said locking means to permit operation of the thrust reverser mechanism.

2. A lock as claimed in claim 1, further comprising biasing means of raising said first and second discs axially into engagement.

3. A lock as claimed in claim 2, in which said electromechanical means comprises a solenoid.

4. A lock as claimed in claim 3, in which said solenoid when actuated disengages said first and second brake discs.

5. A lock as claimed in claim 4, further comprising a member to which said first brake discs are rotationally fixed and which is selectively disengageable from said shaft.

6. A lock as claimed in claim 5, in which said solenoid has an armature constituting said member.

7. A lock as claimed in claim 5, in which said shaft and said member are biased into engagement with each other and are axially movable out of engagement.

8. A lock as claimed in claim 7, further comprising a manual drive arrangement including a connector for receiving a drive tool, said manual drive arrangement disengaging said shaft and said member and transmitting rotation to said shaft when the drive tool is applied to said connector.

9. A lock as claimed in claim 8, in which said manual drive arrangement disengages from said shaft when a fluid within said lock is pressurised.

10. A lock for a thrust reverser mechanism in which the thrust reverser mechanism has a plurality of hydraulic actuators for operating a thrust reverser, each actuator having a respective hydromechanical lock, and a synchronizing mechanism having a synchronizing shaft for providing correcting forces maintaining the actuators substantially in synchronism, said lock comprising a shaft for connection to the synchronizing shaft, a plate having at least one tooth extending therefrom rotationally fixed to said shaft, and at least one peg movable parallel to a longitudinal axis of said shaft, said at least one peg being biased towards an engaging position for engaging said at least one tooth to restrict motion of the synchronizing shaft so as to prevent operation of the thrust reverser mechanism, and electromechanical means for selectively moving said at least one peg away from the engaging position to permit operation of the thrust reverser mechanism.

11. A lock as claimed in claim 10, in which said electromechanical means comprises a solenoid which when actuated moves said at least one peg away from the engaging position.

12. A lock as claimed in claim 10, further comprising a manual drive arrangement including a connector for receiving a drive tool, said manual drive arrangement disengaging said at least one stop from said shaft and transmitting rotation to said shaft when the drive tool is applied to said connector.

13. A lock as claimed in claim 12, in which said manual drive arrangement disengages from said shaft when a fluid within said lock is pressurized.

14. A lock as claimed in claim 12, in which said manual drive arrangement includes torque limiting means for limiting transmission of torque from said connector to said shaft.

15. A lock for a thrust reverser mechanism, in which the thrust reverser mechanism has a plurality of actuators for operating a thrust reverser and a synchronizing mechanism having a synchronizing shaft for maintaining the actuators substantially in synchronism, said lock comprising normally locked mechanical locking means arranged to connect to the synchronizing shaft and to restrict rotation thereof so as to prevent operation of the trust reverser mechanism, electromechanical means for selectively unlocking said locking means to permit operation of the thrust reverser mechanism, and a piston movable when a fluid within said lock is pressurized to prevent movement of said electromechanical means so as to prevent a change of locking state of said lock.

* * * * *